US005632672A

United States Patent [19]
Higashihara

[11] Patent Number: 5,632,672
[45] Date of Patent: May 27, 1997

[54] AIR CONDITIONING APPARATUS WITH FILM MEMBER

[75] Inventor: Akihito Higashihara, Chiryu, Japan

[73] Assignee: Nippondenso Co., Ltd., Kariya, Japan

[21] Appl. No.: 539,526

[22] Filed: Oct. 6, 1995

[30] Foreign Application Priority Data

Oct. 6, 1994 [JP] Japan .................. 6-242757

[51] Int. Cl.⁶ .................................. B60H 1/26
[52] U.S. Cl. ............................ 454/121; 454/126
[58] Field of Search ...................... 454/121, 126

[56] References Cited

U.S. PATENT DOCUMENTS 5,399,120  3/1995  Burns et al. ................ 454/126

FOREIGN PATENT DOCUMENTS 1-186415  7/1989  Japan .................. 454/121
4-257720  9/1992  Japan .
5-296553  11/1993  Japan .................. 454/126
6-074548  3/1994  Japan .................. 454/121

*Primary Examiner*—Harold Joyce
*Attorney, Agent, or Firm*—Cushman, Darby & Cushman IP Group of Pillsbury Madison & Sutro LLP

[57] ABSTRACT

In an air conditioning device using a flexible film member as a blow mode switching door and by design leaking an amount of air from an air outlet in a blow mode, the amount of leaking air does not significantly change even though the position of the film member shifts from an optimal position. The width of a first opening in the device casing in the vertical direction (perpendicular to the direction of movement of the film member when shifting between blow modes) is shorter than a width of a second opening in the casing in the vertical direction. The length of a first air outlet facing the first opening portion in the direction of film member movement is greater than a predetermined length. Therefore, even if the position of the film in a foot mode is shifted, the area of the first opening is not significantly changed.

13 Claims, 8 Drawing Sheets

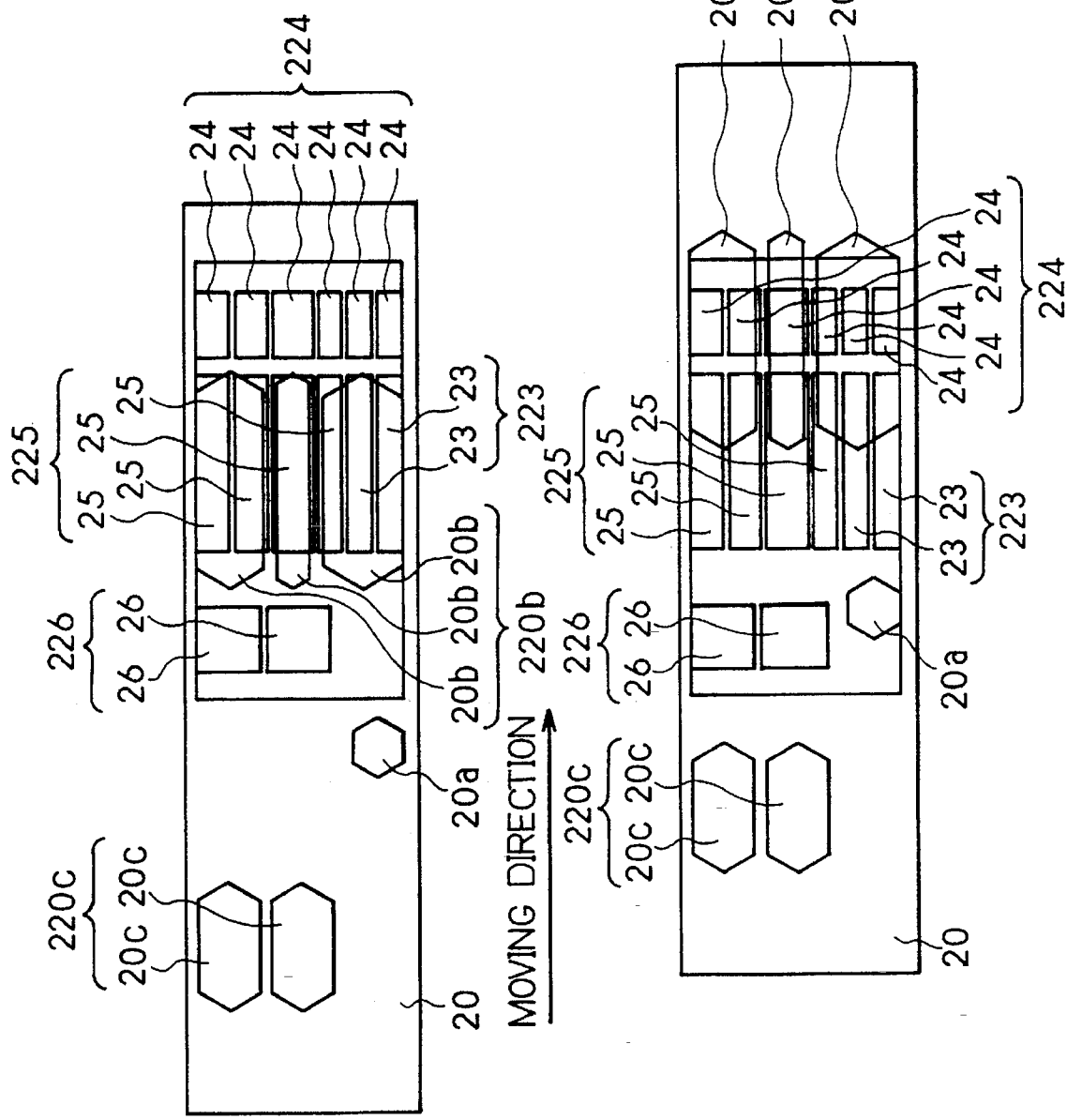

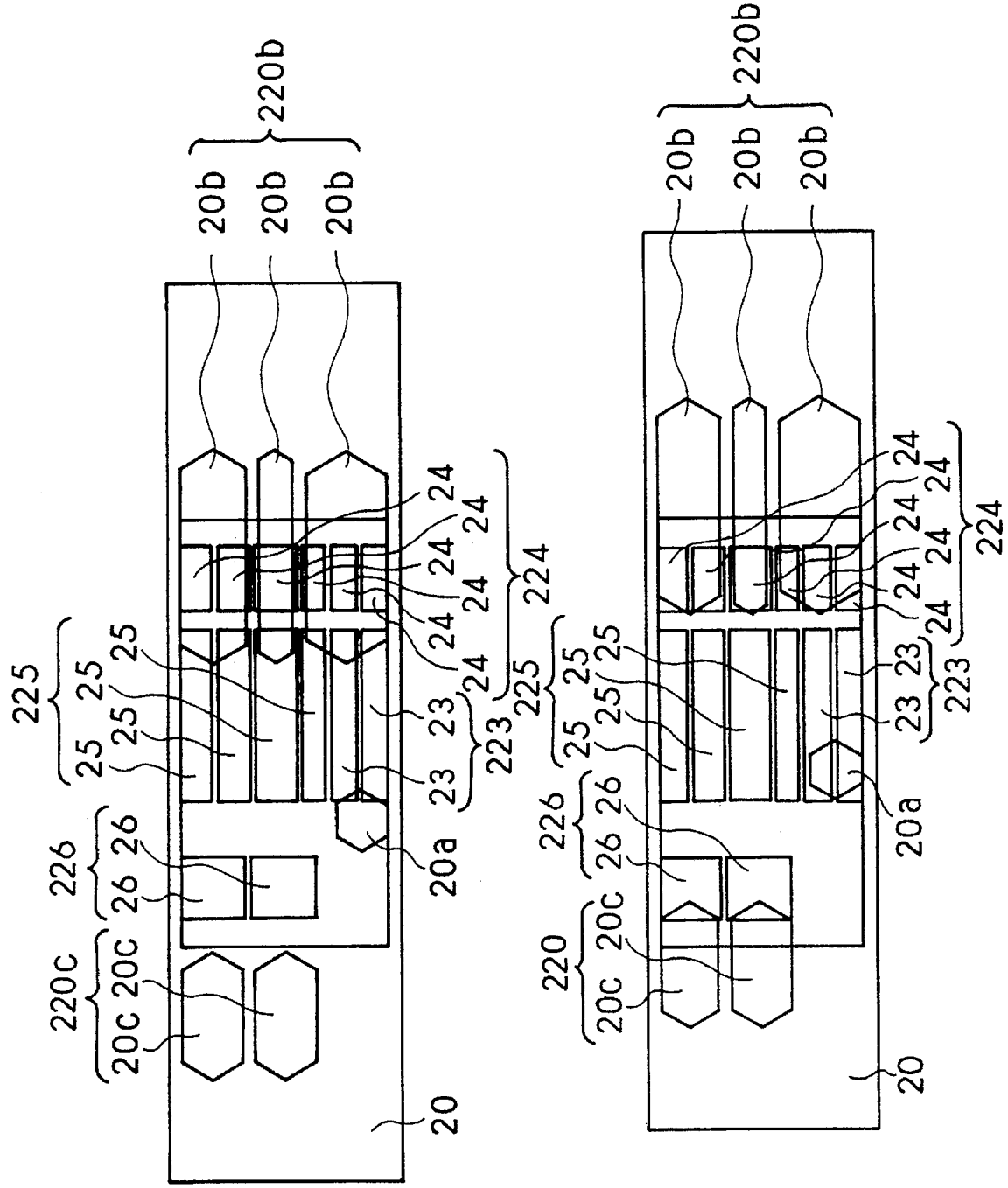

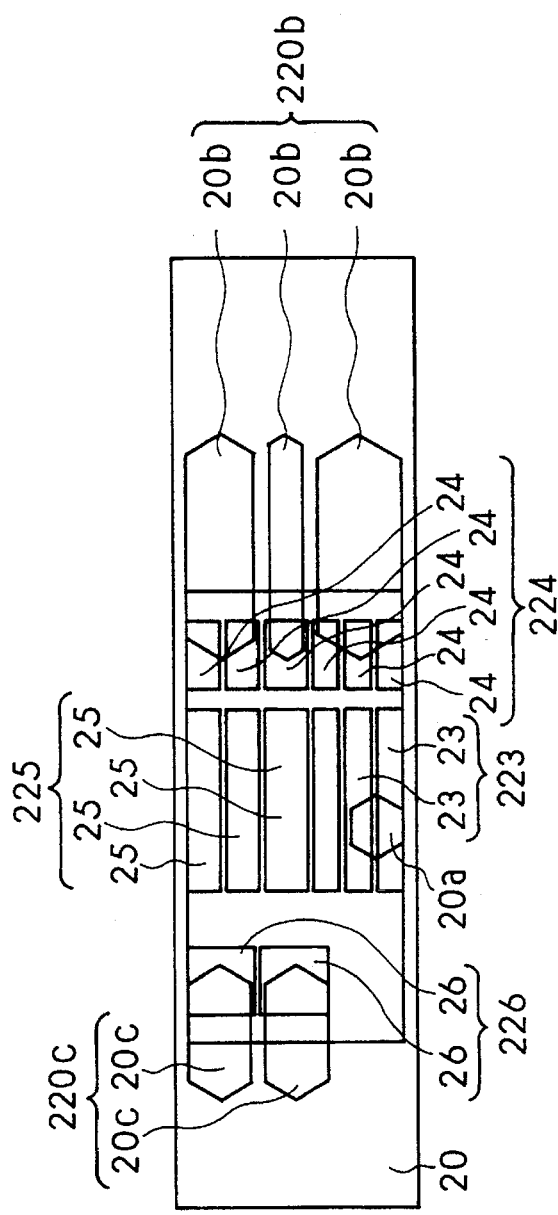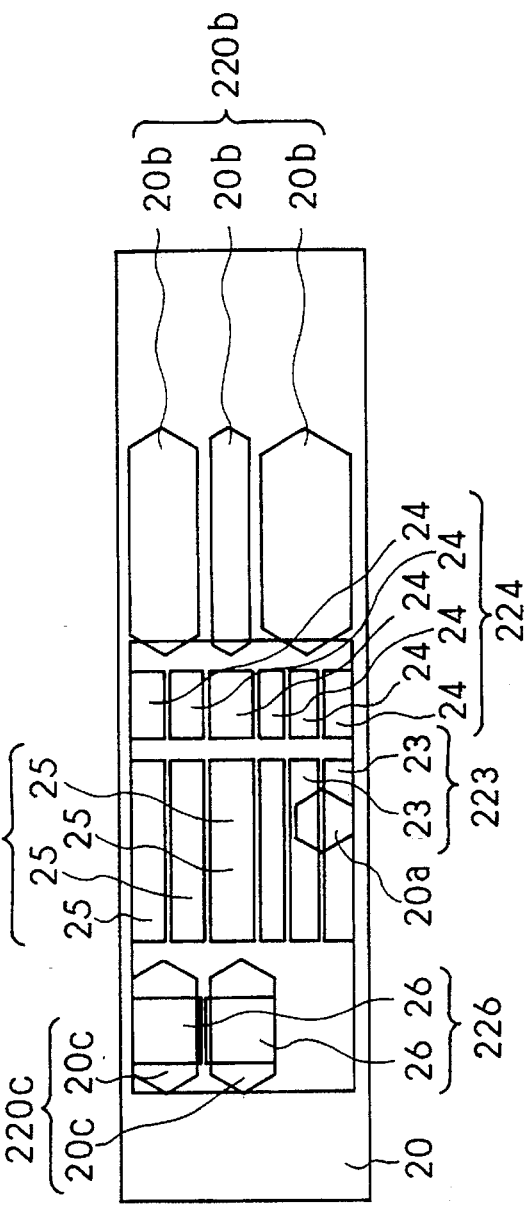
FIG. 5A
FIG. 5B

AIR CONDITIONING APPARATUS WITH FILM MEMBER

BACKGROUND OF THE INVENTION

1. Field of the Invention

The present invention relates to an air conditioning apparatus switching a blow mode by moving a flexible film member having opening portions to pass air and opposing each air outlet of an air conditioning case.

2. Description of Related Art

As shown in FIG. 6, an automotive air conditioning apparatus disclosed in Japanese Patent Application Laid-Open 4-257720 includes a blower 102, an evaporator 103 and a heater core 104 provided in order from an air upstream side of an air conditioning case 101. At an air downstream end of the air conditioning case 101, a face air outlet 105, a foot air outlet 106 and a defroster air outlet 107 are provided. The air outlets 105 through 107 communicate respectively with a face blow outlet, a foot blow outlet, a defroster blow outlet (not shown in Figure) formed inside an automotive passenger compartment. A blow mode switching door 108 made of a flexible film member is provided extendedly so as to face each of the above-described air outlets 105 through 107.

At the door 108, opening portions to pass air are formed. At both ends of the door 108, a driving shaft 109 and a driven shaft 110 are installed. By rotating the driving shaft 109 and the driven shaft 110 in clockwise and counterclockwise directions, the door 108 can move inside the air conditioning case 101.

Positional relations between the opening portions of the door 108 and each air outlet are shown in FIGS. 7A through 7E. A defroster mode is shown in FIG. 7A, a foot/defroster mode is in FIG. 7B, a foot mode is in FIG. 7C, a bi-level mode is in FIG. 7D and a face mode is in FIG. 7E.

Among various kinds of automobiles, an automotive air conditioner is designed to blow a small amount of leak air from the side face blow outlet in the foot mode. In order to blow a small amount of air from the side face blow outlet in the foot mode by using the door 108 in FIGS. 7A through 7E, a portion between a right end and a broken line in the face air outlet 105 as shown in FIG. 8 is formed as an air outlet communicating with the side face blow outlet. Moreover, the door 108 is provided at a position shown in FIG. 8.

In this case, the air amount blown off from the side face blow outlet is determined by an area in which an opening portion 111 of the door 108 opens the side face blow outlet, that is, a product of a width t1 multiplied by a width t2 in FIG. 8. As shown in FIG. 8, since the width t2 is equal to a width t3 in a vertical direction of an opening portion 112 opening a foot air outlet 106 (t2=t3), the width t2 is long enough, and therefore, to make a value of t1×t2 small, a value of the width t1 must be small.

Thus, providing that the width t1 is small and the width t2 is long, for example, when a desired stop position (a position in FIG. 8) of the door 108 happens to shift from an actual stop position of the door 108 for any reason, that is, when the value of width t1 is changed, the value of t1×t2 is changed largely. That is, the amount of leak air blown from the side face blow outlet is changed to a large degree from a desired amount.

The above described problem occurs generates whenever a certain amount of air is intentionally leaked from a certain blow outlet in certain blow mode.

SUMMARY OF THE INVENTION

In view of the foregoing problems of the prior art in mind, a primary object of the invention is that in an air conditioning apparatus switching a blow mode by moving a flexible film member having opening portions to pass air while facing each of air outlets of an air conditioning case, and allowing a small amount of air leaking from a predetermined blow outlet in a predetermined blow mode, even though a position of the film member is shifted from a desired position, the amount of air leaking from the predetermined blow outlet is not changed significantly.

The present invention is directed to an air conditioning apparatus that satisfies these needs. An air conditioning apparatus having features of the present invention includes an air conditioning case, first and second air outlets, a flexible film member and driving means. The air conditioning case leads air to an automotive passenger chamber. The first and the second air outlets are formed in an air downstream side of the air conditioning case. A width of the first air outlet in a vertical direction perpendicular to a movement direction thereof is shorter than a width of the second air outlet. The flexible film member has first and second opening portions passing the air and is installed in the air conditioning case so as to face first and the second air outlets. Further, an entire length of the first opening portion in the moving direction is designed to be shorter than a length of the first air outlet. When the driving means moves the film member, the blow mode blowing off the air to the inside of an automotive passenger compartment is switched. Further, in the blow mode in which the first opening portion opens the first air outlet and the second opening portion opens the second air outlet, an opening area in which the first opening portion opens the first air outlet is smaller than an opening area in which the second opening portion opens the second air outlet and the first opening portion is disposed so as to face the first air outlet.

BRIEF DESCRIPTION OF THE DRAWINGS

Additional objects and advantages of the present invention will be more readily apparent from the following detailed description of preferred embodiments thereof when taken together with the accompanying drawings in which:

FIG. 3A is a view illustrating a positional relation between each air outlet and the blow mode switching door in a face mode;

FIG. 3B is a view illustrating a positional relation between each air outlet and the blow mode switching door in a first bi-level mode;

FIG. 4A is a view illustrating a positional relation between each air outlet and the blow mode switching door in a second bi-level mode;

FIG. 4B is a view illustrating a positional relation between each air outlet and the blow mode switching door in a foot mode;

FIG. 5A is a view illustrating a positional relation between each air outlet and the blow mode switching door in a foot/defroster mode;

FIG. 5B is a view illustrating a positional relation between each air outlet and the blow mode switching door in a defroster mode;

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
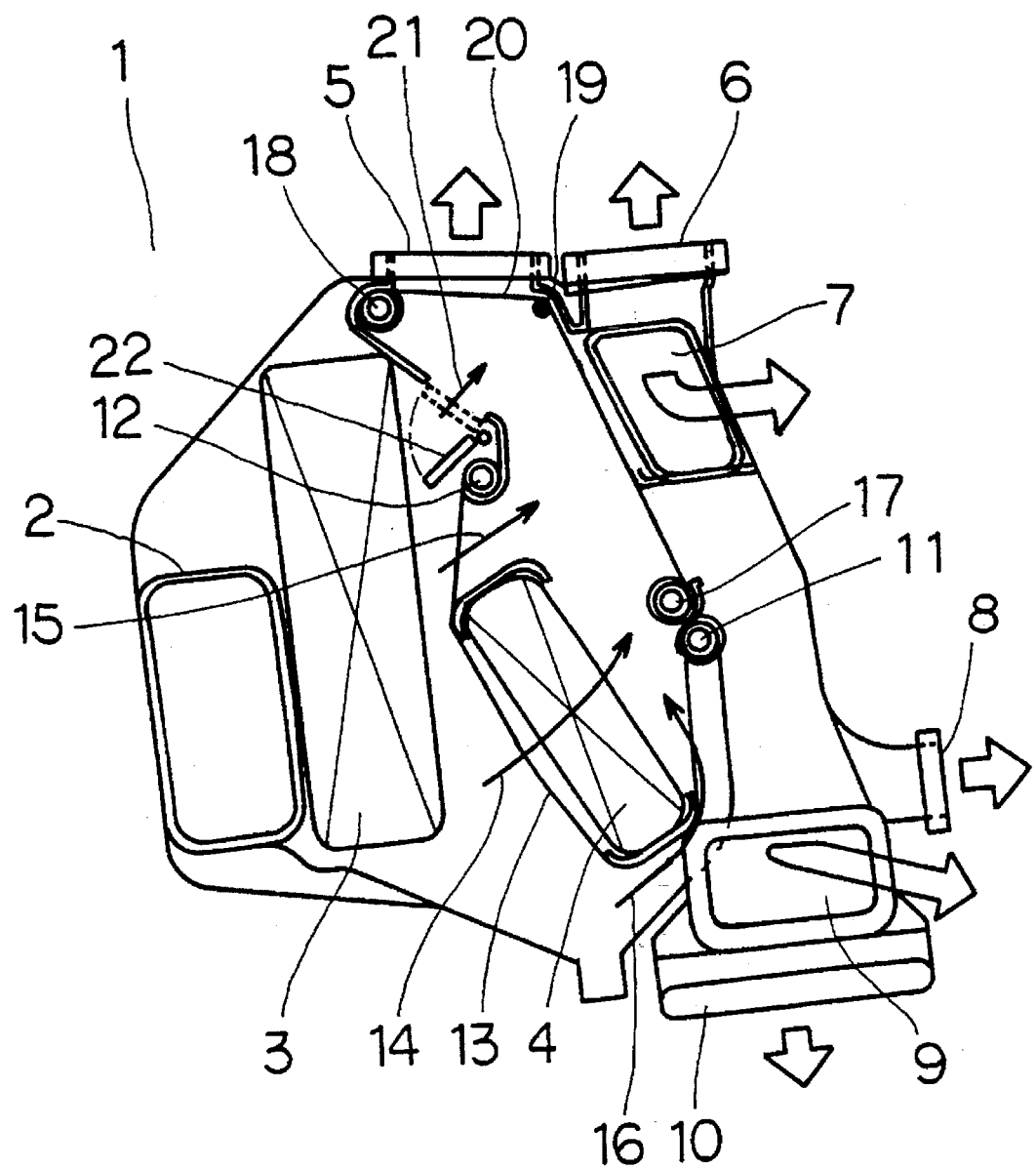
FIG. 1 is a schematic construction view illustrating a whole air conditioning system of an embodiment of the present invention.

FIG. 1 is a schematic construction view of a whole air conditioning system of the present embodiment. An air conditioning case 1 forms an air passage ventilating an inside of an automotive passenger compartment. In a most upstream side of the air conditioning case 1, an opening portion 2 for introducing air to the inside of the air conditioning case i is formed. At the opening portion 2, a blower unit (not shown in the figures) accommodating a blower is connected to a front side of the Figures. By rotating the blower, air flow toward the inside of the automotive compartment is generated in the air conditioning case 1.

Inside the air conditioning case 1, an evaporator 3 and a heater core 4 are provided in order from the air upstream side. The evaporator 3 is a heat exchanger for cooling air which forms a known refrigerant cycle with a compressor, a condenser and pressure reduction means, and cools air inside the air conditioning case 1. The heater core 4 is a heat exchanger for heating air in which engine cooling water flows and heats up air inside the air conditioning case 1.

At an air downstream end of the air conditioning case 1, a plurality of air outlets (refer to FIG. 2A) described later are formed. At a downstream side of each air outlet described above, ducts 5 through 10 are disposed to blow conditioned air to each part of the automotive compartment.

At a most upstream portion of the duct 5, a defroster blow outlet (not shown in the figures) are formed to blow the conditioned air toward an inside surface of a windshield in the automotive compartment. At a most upstream portion of the duct 6, a center face blow outlet (not shown in the figures) is formed to blow the conditioned air toward an upper half body of a front seat passenger from a middle portion in a vehicle width direction. At a most upstream portion of the duct 7, a side face blow outlet (not shown in the figures) is formed to blow the conditioned air toward the upper half body of the front seat passenger in a side glass side. At a most upstream portion of the duct 8, a rear face blow outlet (not shown in the figures) is formed to blow the conditioned air toward the upper half body of a back seat passenger. At a tip end portion of the duct 9, a front foot blow outlet (not shown in the figures) is formed to blow the conditioned air toward feet of the front seat passenger. At a tip end portion of the duct 10, a rear foot blow outlet (not shown in the figures) is formed to blow the conditioned air toward feet of the back seat passenger.

Inside the air conditioning case 1, a first driving shaft 11 as a rotational axis and a first driven shaft 12 as a rotational axis are rotatably supported by the air conditioning case 1. At the first driving shaft 11 and the first driven shaft 12, two ends of an air-mixing door 13 made of a flexible film member are fixed and wound there around. By the first driving shaft 11, the heater core 4 and the first driven shaft 12, the air-mixing door 13 is installed extendedly to cross bypass passages 15 and 16 bypassing the heater core 4 and a hot-air passage 14 in which air passes through the heater core 4.

The first driving shaft 11 is rotated, for example, by driving means (specifically, a step motor) such as an electric motor or the like. A rotational force of the first driving shaft 11 is transmitted to the first driven shaft 12 by a rotational force transmitting means (specifically, a wire) not shown in the figures.

At the air-mixing door 13, an opening portion (not shown in the figures) and passing air is formed. By stopping the opening portion at a desired position by rotating the first driving shaft 11 in clockwise and counterclockwise directions by the step motor, an amount of air passing through each of the passages 14 through 16 is adjusted. A method for controlling a stop position of the air-mixing door 13 is controlled with a driving signal output to the step motor from a control device (not shown in the figures).

Inside the air conditioning case 1, a second driving shaft 17, a second driven shaft 18 and an intermediate shaft 19 as rotational axes are supported rotatably at the air conditioning case 1. At the second driving shaft 17 and the second driven shaft 18, two ends of a blow mode switching door 20 made of a flexible film member are fixed and wound there around. By the second driving shaft 17, the intermediate shaft 19 and the second driven shaft 18, the blow mode switching door 20 is installed extendedly so as to face a wall surface of the air upstream side of each of the air outlets (refer to FIG. 2A).

The second driving shaft 17 is rotated by the driving means such as an electric motor (specifically, a step motor). A rotational force of the second driving shaft 17 is transmitted to the second driven shaft 18 by rotational force transmitting means (specifically, a wire).

Opening portions (refer to FIG. 2B) to pass air are formed at the blow mode switching door 20. By stopping the opening portions at a desired position by rotating the second driving shaft 17 in clockwise and counterclockwise directions by the step motor, the blow mode is switched. A method for controlling a stop position of the blow mode switching door 20 is controlled with the driving signal output to the step motor from the control device (not shown in the figures).

Inside the air conditioning case 1, a cooling air bypass passage 21 leading cooling air directly to the ducts 6 and 7 is formed and a cooling air bypass door 22 opening and closing the cooling air bypass passage 21 is provided. The cooling air bypass door 22 opens the cooling air bypass passage 21 when the opening portion of the air-mixing door totally closes the hot-air passage 14 and opens the bypass passages 15 and 16 fully.

Figure 2A:
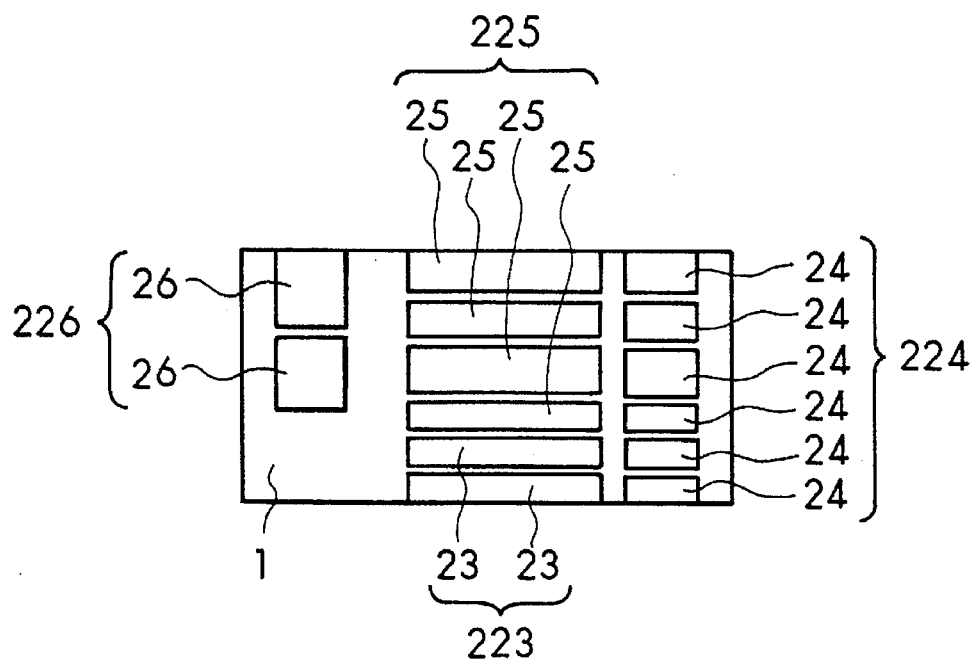
FIG. 2A is a view illustrating a shape of each air outlet.

Next, the air outlet is explained with FIG. 2A.

As shown in FIG. 2A, a plurality of air outlets 23 through 26 are formed at a downstream end portion of the air conditioning case 1. Air passing through the air outlet 23 is blown off from the side face blow outlet through the duct 7. Air passing through the air outlet 24 is blown off from the front foot blow outlet and the rear foot blow outlet through ducts 9 and 10. Air passing through the air outlet 25 is blown off from the center face blow outlet and the rear face blow outlet through the ducts 6 and 8. Air passing through the air outlet 26 is blown off from the defroster blow outlet through the duct 5. The film blow mode switching door 20 is disposed against the air outlets 23 through 26 (refer to FIGS. 3 through 5). At the air outlets 23 through 26, the air outlets 24, 23, 25 and 26 are formed in order at predetermined intervals in a direction from the right to the left in FIG. 2 along a movement direction of the blow mode switching door 20.

In order to explain easily, a group of the air outlets 23 are defined as a first air outlet 223, a group of the air outlets 24 are defined as a second air outlet 224, a group of the air outlets 25 are defined as a third air outlet 225 and a group of air outlets 26 are defined as a fourth air outlet 226.

The second air outlet 224 is in the form of a rectangular shape. A width of the second air outlet 224 defined as a length in a vertical direction (in the above and below direction in FIG. 2A) perpendicular to the movement direction of the blow mode switching door 20 is shorter than the width of the blow mode switching door 20 disposed to cover the second air outlet 224.

The first and third air outlets 223 and 225 are disposed in the same row along the vertical direction. As shown in FIG. 2A, the third air outlet 225 is in the form of a square. The first air outlet 223 is in the form of a rectangle of which a longitudinal direction extends along the movement direction. The length of the first and third air outlets 223 and 225 in the movement direction are the same.

Each width of the first and third air outlets 223 and 225 in the vertical direction is shorter than the width of the second air outlet 224 and the width of the third air outlet 225 is larger than the width of the first air outlet 223. As shown in FIG. 2A, the sum of the widths of the first and third air outlets 223 and 225 is the same as the width of the second air outlet 224.

That is, an opening area of the third air outlet 225 is larger than an opening area of the first air outlet 223. This is because the third air outlet 225 communicates only with the center face blow outlet and the first air outlet 223 communicates only with the side face blow outlet, and therefore, in general, a larger amount of air is necessary for the third air outlet 225 corresponding to a passenger's thermal sense.

The fourth air outlet 226 has a rectangular shape of which a longitudinal direction is the vertical direction. The width in the vertical direction of the fourth air outlet 226 is smaller than the width of the second air outlet 224 and larger than the width of the first air outlet 223. The fourth air outlet 226 is formed in the upper side in FIG. 2A to face the blow mode switching door 20.

Next, the blow mode switching door 20 is explained.

Figure 2B:
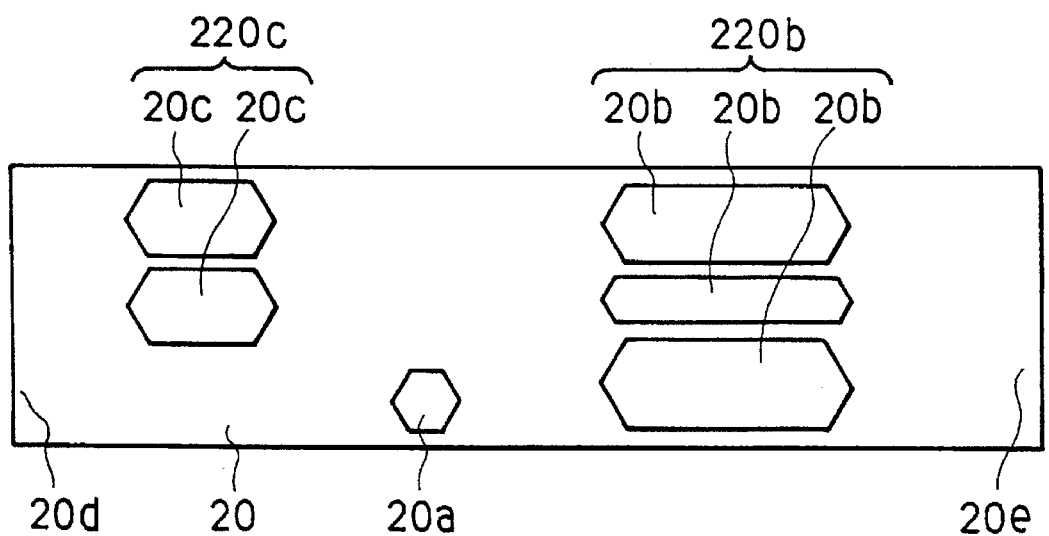
FIG. 2B is a view illustrating a blow mode switching door.
Figure 6:
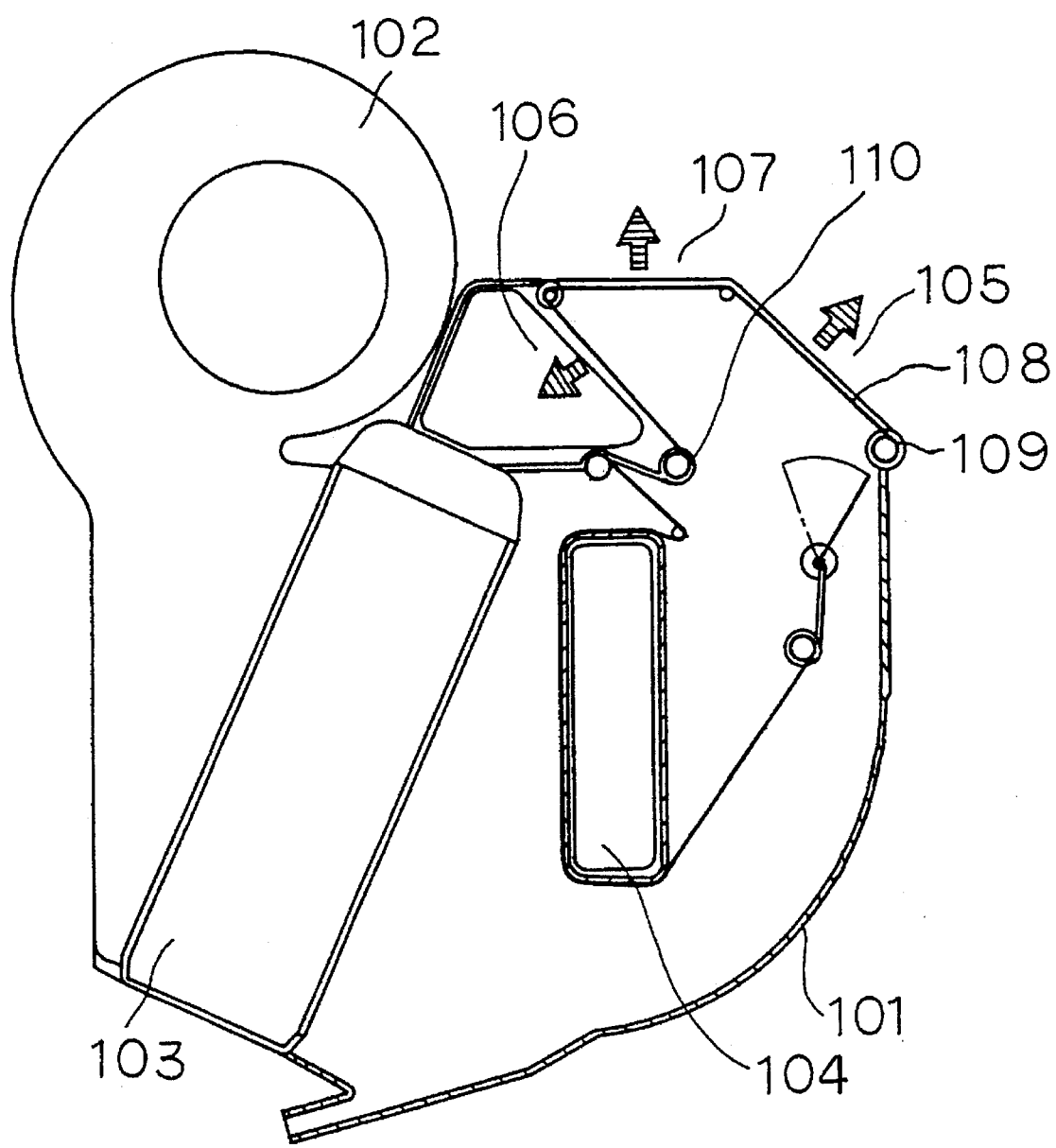
FIG. 6 is a schematic construction view illustrating a whole system of blowing air of a conventional air conditioning apparatus.
Figure 7:
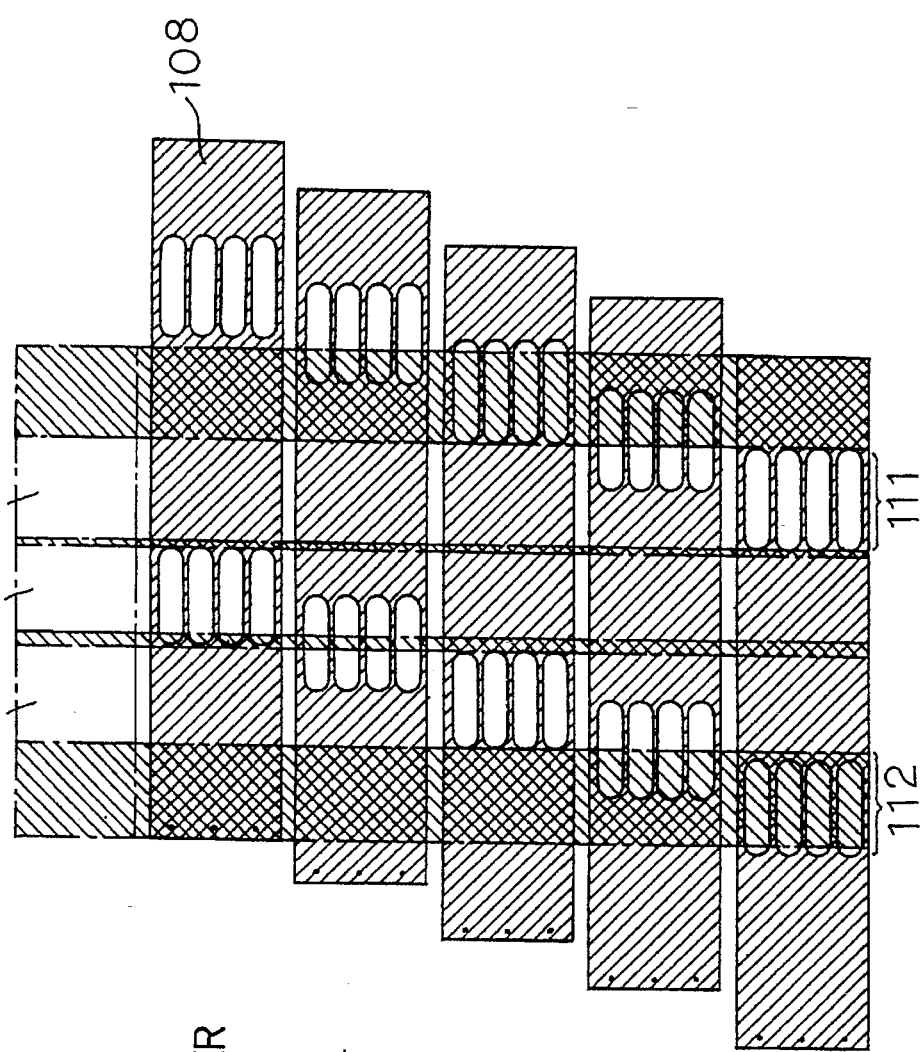
FIGS. 7A through 7E are views illustrating positional relations between an opening portion of the blow mode switching door and each air outlet in the conventional apparatus.
Figure 8:
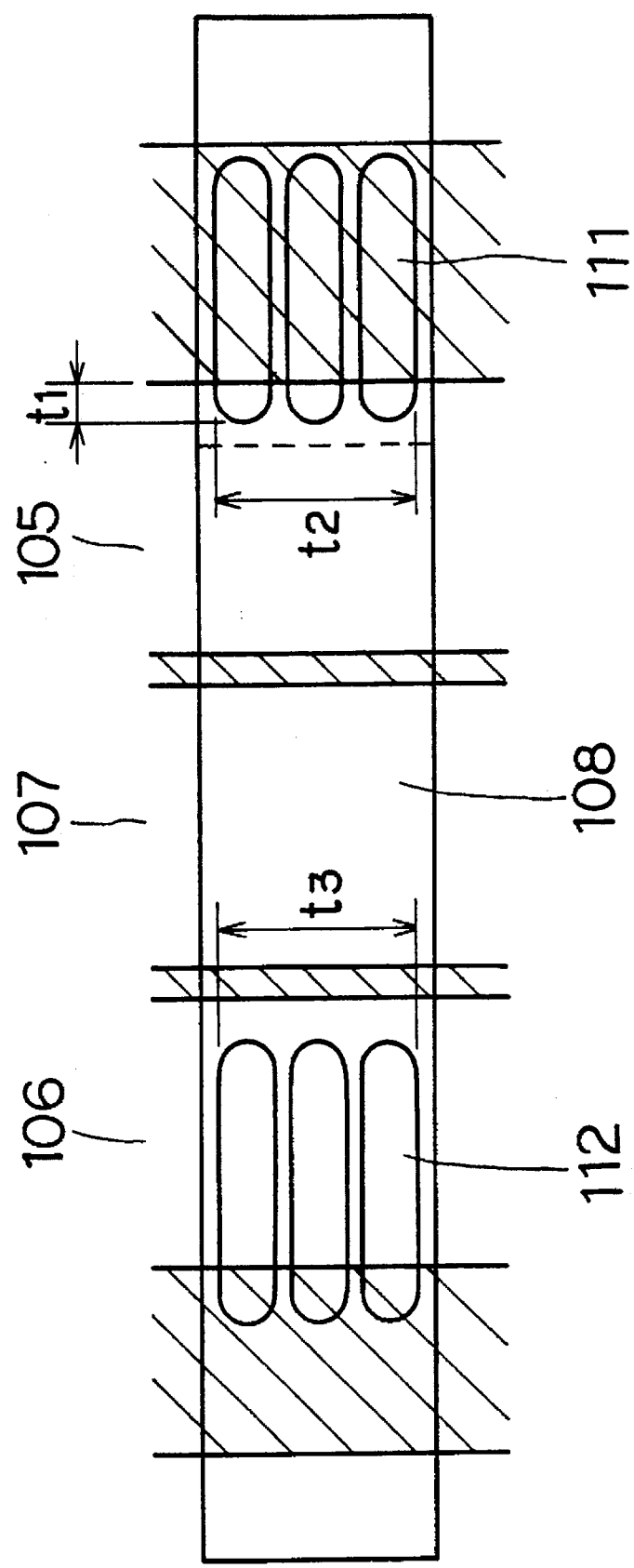
FIG. 8 is a view illustrating a positional relation between each air outlet and the door in FIG. 7 in a case of leaking a small amount of air from a side face blow outlet in the foot mode.

As shown in FIG. 2B, the blow mode switching door 20 has a rectangular shape. The blow mode switching door 20 has a portion 20d fixed at the second driven shaft 18 and a portion 20e fixed at the second driving shaft 17. That is, the blow mode switching door 20 moves from left to right in FIG. 2B.

At the blow mode switching door 20, a first opening portion 20a, a plurality of second opening portions 20b and a plurality of third opening portions 20c are formed.

In order to understand easily, a group of the second opening portions 20b are defined as a second opening portion 220b and a group of the third opening portions 20c are defined as a third opening portion 220c. The second opening portion 220b, the first opening portion 20a and the third opening portion 220c are formed respectively from the right side to the left side in the order in FIG. 2B at a fixed intervals.

The second opening portion 220b has an approximate rectangular shape. The width of the second opening portion 220b in the vertical direction is almost the same as the width of the second air outlet 224. The second opening portion 220b is formed in almost the entire width of the blow mode switching door 20 in the vertical direction. A length of the second opening portion 220b in the moving direction is designed to be a little larger than a length of the third air outlet 225.

The first opening portion 20a has a hexagonal shape. The width of the first opening portion 20a in the vertical direction is shorter than the widths of the second opening portion 220b and the third opening portion 220c described later and is the same as the width of the first air outlet 23. Moreover, a length of the first opening portion 20a in the moving direction is smaller than other opening portions (the second opening portion 220b and the third opening portion 220c) and smaller than a length of the first air outlet 223. In the present embodiment, the length of the first opening portion 20a is almost one third of the length of the first air outlet 223.

When the blow mode switching door 20 is disposed to face those opening portions (refer to FIGS. 3A through 5B), the first opening portion 20a is formed at a position where the first opening portion 20a faces the first air outlet 223. That is, the first opening portion 20a is formed at a lower end side of the blow mode switching door 20 in FIG. 2B.

The third opening portion 220c has a rectangular shape. The width of the third opening portion 220c is equal to the width of the fourth air outlet 226. A length of the third opening portion 20c is designed to be larger than the width of the fourth air outlet 226.

Next, at each blow mode, positional relations between the blow mode switching door 20 and each of air outlets 223 through 226 are explained with reference to FIGS. 3A through 5B.

FIG. 3A illustrates a face mode. In the face mode, the first and third air outlets 223 and 225 are fully opened by the second opening portion 220b. The second and fourth air outlets 224 and 226 are totally closed. Thus, air passing through the first air outlet 223 is blown from the side face blow outlet and air passing through the third air outlet 225 is blown from the center face blow outlet and the rear face blow outlet. At that time, the first opening portion 20a is positioned more outside than the fourth air outlet 226 in the moving direction, that is, the first opening portion 20a is positioned in the left side of the fourth air outlet 226 in the Figure.

FIG. 3B illustrates a first bi-level mode. In the first bi-level mode, the first and third air outlets 223 and 225 open only half the way by the second opening portion 220b and the second air outlet 224 is opened fully. Therefore, air passing through the second opening portion 220c is blown off from the face blow outlet and the side face blow outlet. Air passing through the second air outlet 224 is blown off from the front foot blow outlet and the rear foot blow outlet. At the first bi-level mode, total amount of air blown off from the face blow outlet and the side face blow outlet is almost equal to total amount of air blown off from the front foot blow outlet and the rear foot blow outlet.

FIG. 4A illustrates the second bi-level mode. An area in which the second opening portion 220b opens the first and third air outlets 223 and 225 is smaller than the first bi-level mode shown in FIG. 3B. Further, the first opening portion 20a opens the first air outlet 223 a little.

FIG. 4B illustrates a foot mode. In the foot mode, the second air outlet 224 is opened fully by the second opening portion 220b and the first air outlet 223 is opened by the first opening portion 20a. Thereby, almost all (about 80%) of the air in the air conditioning case 1 is blown off from the foot blow outlets and the remaining little amount of air is blown off from the side face blow outlet.

FIG. 5A illustrates a foot defroster mode. In the foot defroster mode, the second air outlet 224 is opened halfway by the second opening portion 220b and the fourth air outlet 226 is opened halfway by the third opening portion 220c. At that time, the first air outlet 223 is opened by the first opening portion 20a. Thereby, almost all air to be air conditioned in the air conditioning case 1 is blown off from the foot blow outlet and the small amount of defroster blow outlet and the air remaining is blown off from the side face blow outlet.

FIG. 5B illustrates the defroster mode. In the defroster mode, the fourth air outlet 226 is opened fully by the third opening portion 220c and the first air outlet 223 is opened by the first opening portion 20a. Thereby, almost all air to be air conditioned in the air conditioning case 1 is blown off from the defroster blow outlet and the remaining small amount of air is blown off from the side face blow outlet. At that time, the second opening portion 220b is more outside in the moving direction than the second air outlet 224, that is, the second opening portion 220b is in the right side in the figure.

As shown in FIG. 4B, at the foot mode of the present embodiment, most of the air is blown off from the foot blow outlet and the small amount of air remaining is blown off from the side face blow outlet, and therefore, the first air outlet 223 is opened by the first opening portion 20a.

That is, the width of the first air outlet 223 in the vertical direction in FIG. 4A is shorter than the width of the second air outlet 224. Further, the length of the first air outlet 223 in the moving direction is larger than the length of the first opening portion 20a. In the foot mode in FIG. 4B, the first opening portion 20a is completely covered by the first air outlet 223.

When a position of the blow mode switching door 20 recognized by the control device (not shown in the figures) shifts from an actual position of the blow mode switching door 20, the position of the blow mode switching door 20 at the foot mode shifts slightly from the position shown in FIG. 4B. At that time, since the width of the first air outlet 223 is shorter than the width of the second air outlet 224 and an opening area of the first air outlet 223 defined by the first opening portion 20a is very small, an opening area which the first opening portion 20a opens the first air outlet 223 does not change to a large degree. Consequently, the amount of the air blown off from the side face blow does not change to a large degree. Even though the blow mode switching door 20 shifts a little toward the right side in FIG. 4B, since the length of the first air outlet 223 is longer than the first opening portion 20a, the opening area which the first opening portion 20a opens the first air outlet 223 becomes constant and the amount of air blown off from the side face blow outlet does not change.

Effects of the foot defroster mode and the defroster mode are the same as the effect of the foot mode explained the above. Especially in those modes, as shown in FIGS. 5A and 5B, the first opening portion 20a is arranged in the middle portion of the first air outlet 223 in the longitudinal direction. Therefore, even though the first opening portion 20a shifts in either left or right direction, the opening area opening the first air outlet 223 by the first opening portion 20a is constant and the amount of air blown off from the side face blow outlet is also constant.

Especially in the defroster mode shown in FIG. 5B, since the first opening portion 20a is disposed to face the middle portion of the first air outlet 223 and the middle portion of the third opening portion 220c in the longitudinal direction is disposed to face the fourth air outlet 226, even though the first opening portion 20a and the third opening portion 220c shifts in left or right direction in FIG. 5B, a desired amount of air is blown off from the defroster blow outlet and the side face blow outlet.

Further, when the blow mode switching door 20 moves between the face mode shown in FIG. 3A and the second bi-level mode shown in FIG. 4A, the width of the fourth air outlet 226 is shorter than the width of the blow mode switching door 20 and does not face the first opening portion 20a. The fourth air outlet 226 does not exist on a moving trace of the first opening portion 20a.

Therefore, between the face mode shown in FIG. 3A and the second bi-level mode in FIG. 4B, air conditioned air from the fourth air outlet 226 is prevented from leaking.

The present invention having been described should not be limited to the disclosed embodiments, but it may be modified in many other ways without departing from the scope and the spirit of the invention.

What is claimed is:

1. An air conditioning apparatus for a vehicle, said apparatus comprising:

an air conditioning case for leading air to a passenger compartment of a vehicle;

a first air outlet in a downstream side of said case, said first air outlet being for communicating with a side face blow outlet for blowing air toward an upper half body of a passenger who is adjacent to a side glass in said passenger compartment;

a second air outlet in a downstream side of said case, said second air outlet being for communicating with a foot blow outlet for blowing air toward feet of said passenger; and a flexible film member having first and second opening portions for passing said air and being movably installed in said air conditioning case so that said first and second opening portions respectively face said first and second air outlets;

wherein a width of said first air outlet in a vertical direction perpendicular to a moving direction of said film member in said case is shorter than a width of said second air outlet in said vertical direction;

an entire length of said first opening portion in said moving direction is shorter than a length of said first air outlet; and in a foot mode of said air conditioning apparatus, in which said first opening portion opens to said first air outlet and said second opening portion opens to said second air outlet so that most of said air in said air conditioning case is blown off from said second air outlet and the rest of said air is blown off from said first air outlet, an opening area in which said first opening portion opens to said first air outlet is smaller than an opening area in which said second opening portion opens to said second air outlet, and said first opening portion covers said first air outlet completely.

2. The air conditioning apparatus according to claim 1, wherein:

said first and second air outlets are arranged in said moving direction;

said air conditioning case has a third air outlet disposed in said case on a side of said first air outlet opposite said second air outlet, said third air outlet being for blowing said air to said compartment;

said first and second opening portions are disposed at said film member with an order of said second opening portion and said first opening portion in said opposite direction;

said third air outlet is formed at a position where it does not overlap with a path of said first opening portion when said second opening portion moves from a position in which said second opening portion opens said first air outlet to a position in which said second opening portion opens said second air outlet.

3. The air conditioning apparatus according to claim 2, wherein said third air outlet is formed in a portion of said air conditioning case which faces said film member.

4. The air conditioning apparatus according to claim 3, wherein said third air outlet is formed at one end side of said air conditioning case facing said film member in a vertical direction of said film member and said first opening portion is formed at the other end side of said film member on the same vertical direction.

5. The air conditioning apparatus according to claim 4, wherein said third opening portion is formed in an opposite side of said second opening portion against said first opening portion and said third opening portion is formed at one portion of said film member to correspond to said third air outlet in said vertical direction.

6. The air conditioning apparatus according to claim 5, comprising a fourth air outlet formed in said air conditioning case opposing said film member and adjoining said first air outlet in said vertical direction.

7. The air conditioning apparatus according to claim 1, wherein said second opening portion is formed in almost an entire area of said filter member in said vertical direction.

8. The air conditioning apparatus according to claim 2, wherein said third air outlet communicates with a defroster blow outlet for blowing said air toward an inside surface of an automotive windshield.

9. The air conditioning apparatus according to claim 6, wherein said fourth air outlet communicates with a center face blow outlet for blowing said air toward said upper half body of said passenger almost in said center of automotive width direction of said compartment.

10. The air conditioning apparatus according to claim 1, wherein:

said air conditioning apparatus is installed on vehicles;

said first air outlet communicates with said defroster blow outlet for blowing said air toward an inside surface of said automotive windshield; and said second air outlet communicates with said foot blow outlet for blowing toward feet of said passenger inside said automotive compartment.

11. An air conditioning apparatus for vehicle, said apparatus comprising:

an air conditioning case for leading air to a passenger compartment of a vehicle;

a first air outlet in a downstream side of said case, said first air outlet being for communicating with a side face blow outlet for blowing air toward an upper half body of a passenger who is adjacent to a side glass in said passenger compartment;

a second air outlet in a downstream side of said case, said second air outlet being for communicating with a foot blow outlet for blowing air toward feet of said passenger;

a third air outlet in a downstream side of said case, said third air outlet being for communicating with a center face blow outlet for blowing said air toward said upper half body of said passenger almost in said center of automotive width direction of said compartment;

a fourth air outlet in a downstream side of said case, said fourth air outlet being for communicating with a defroster blow outlet for blowing said air toward an inside surface of a windshield of said vehicle; and a flexible film member having first, second and third opening portions for passing air, said flexible film member being movably installed in said air conditioning case to face said first, second, third and fourth air outlets;

wherein said second air outlet adjoins said first air outlet in a moving direction of said film member, said third air outlet adjoins said first air outlet in a vertical direction perpendicular to said moving direction, and said fourth air outlet adjoins said first air outlet on a side of said case opposite said second air outlet in said moving direction;

a width of said fourth air outlet in said vertical direction is smaller than a total width of said first and third air outlets in said vertical direction;

in a face mode of said air conditioning apparatus, said first opening portion is outside of said fourth air outlet in said moving direction, said second opening portion opens only to said first and third air outlets;

in a foot mode of said air conditioning apparatus, said first opening portion opens to said first air outlet and said second opening portion opens only to said second air outlet;

in a defroster mode of said air conditioning apparatus, said third opening portion opens to said fourth air outlet, said first opening portion opens to said first air outlet and said third opening portion opens to said fourth air outlet; and said fourth air outlet does not overlap with a path of said first opening portion when said film member moves between its position in said face mode and its position in said foot mede.

12. The air conditioning apparatus according to claim 11, wherein said first opening portion and said second opening portion are disposed to prevent from overlapping traces of said first and second opening portions.

13. The air conditioning apparatus according to claim 11, wherein said first opening portion and said second opening portion are disposed to prevent from overlapping each other even if said first and second opening portions are extended along said moving direction hypothetically.

* * * * *